Oct. 24, 1944.　　　O. M. ANDERSON　　　2,361,078

TOASTER

Filed Sept. 18, 1941　　　3 Sheets-Sheet 1

Inventor
OSCAR M. ANDERSON

Attorneys

Oct. 24, 1944.  O. M. ANDERSON  2,361,078
TOASTER
Filed Sept. 18, 1941  3 Sheets-Sheet 2
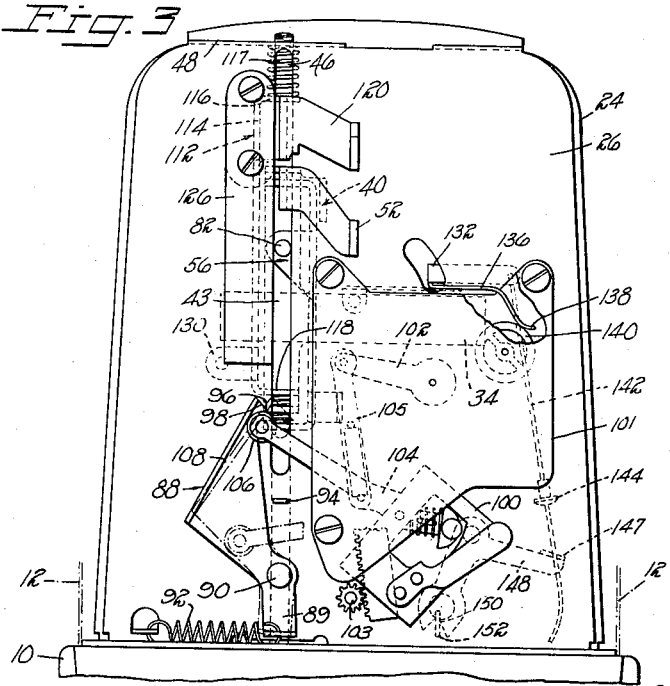
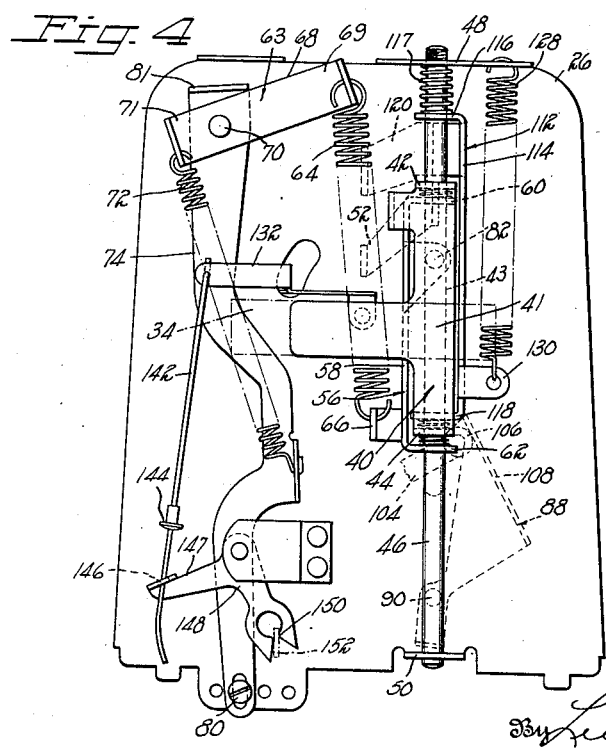
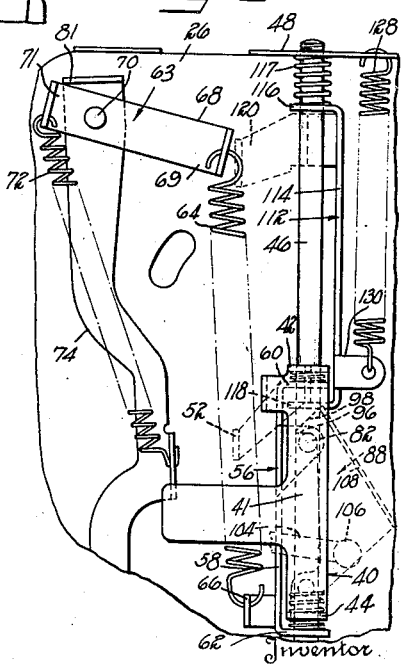
Oscar M. Anderson Inventor Oct. 24, 1944.  O. M. ANDERSON  2,361,078
TOASTER
Filed Sept. 18, 1941   3 Sheets-Sheet 3
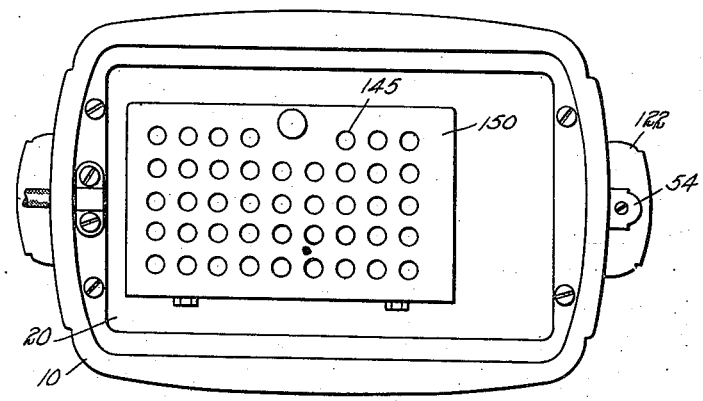
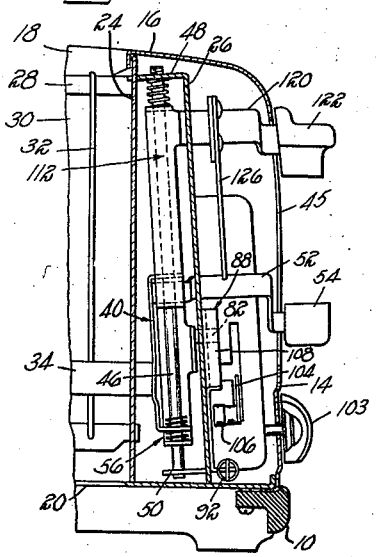
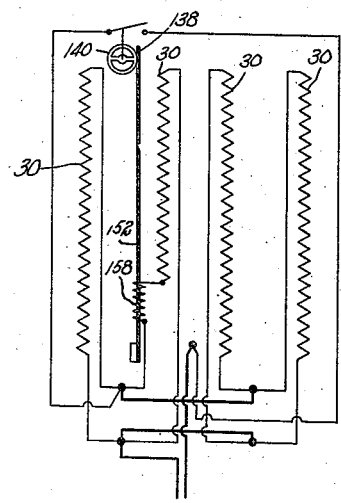
Inventor
OSCAR M. ANDERSON
Attorneys Patented Oct. 24, 1944

2,361,078

UNITED STATES PATENT OFFICE 2,361,078

TOASTER

Oscar M. Anderson, New Britain, Conn., assignor to Landers, Frary & Clark, New Britain, Conn., a corporation of Connecticut Application September 18, 1941, Serial No. 411,301

8 Claims. (Cl. 99—334)

The present invention relates to electric toasters and more generally to those of the automatic type wherein at the completion of a toasting period the toast is automatically raised out of the toaster ovens and the electric circuit cut off.

More specifically, the automatic toaster disclosed is of the type having a bread carrier for receiving the slices of bread, an ejector or elevating means for raising the carrier at the completion of a toasting period, and means for simultaneously lowering the carrier and the elevator and actuating a timing and switch mechanism.

An object of the present invention is to provide in toasters of the above-indicated type improved means whereby the carrier may be raised at any time during a toasting period to permit an inspection of the toast without interfering with the timing and automatic switch mechanism.

Another object is to provide in a toaster of the above-indicated type improved means whereby upon the completion of a toasting period the carrier will be automatically raised by the ejector and without subjecting the mechanism to undue shock, thus assuring continuous and accurate operation of the device and more particularly the sensitive parts thereof, such as the timing and switch mechanism.

A still further object is to provide improved means for controlling the consistency of the toasting; this being accomplished by a thermostat in circuit with the heating elements of the toaster and adapted to prevent operation of the timing mechanism prior to the toaster oven reaching a predetermined temperature, and the further provision of means for rapidly cooling the thermostat and ovens upon removal of bread therefrom at the completion of a toasting period.

A still further object is to provide a toaster wherein substantially all of the parts may be readily stamped and formed from sheet metal and are so constructed as to permit quick assembly and, when assembled, provide a toaster which is dependable and accurate in operation.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawings:

Fig. 3 is an end view looking from the right in Fig. 1 with the outer casing removed and the parts in the same position as in Fig. 1;

Fig. 4 is an end view showing the ejector or elevator operating means with the parts positioned as in Fig. 1;

Fig. 5 is a view similar to Fig. 4, but with the parts in position during a toasting operation;

Fig. 6 is a bottom view of the toaster;

Fig. 7 is a fragmentary view similar to Fig. 1, but with the parts in position during a toasting operation; and Fig. 8 is a diagrammatic view of the electric circuit and thermostatic control means therefor.

Figure 1:
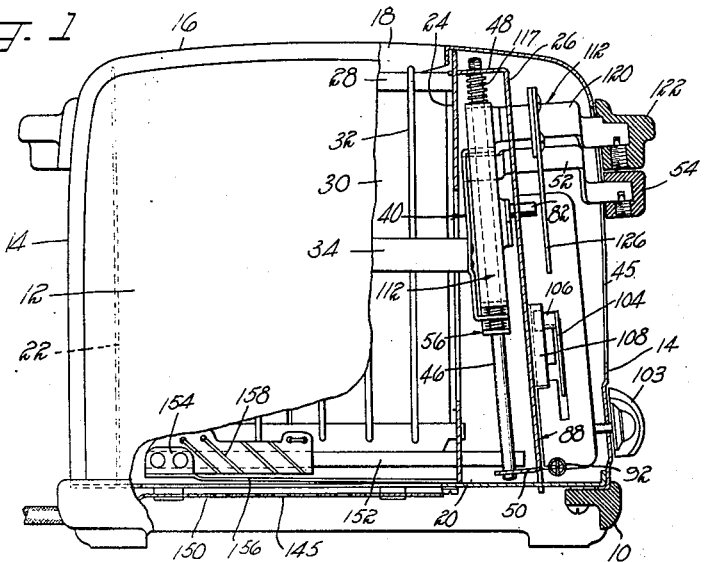
Figure 1 is a side view of the toaster with the outer casing partially broken away and with the parts in normal position prior to the initiation of a toasting operation.

Referring to the drawings, the toaster includes an outer casing comprising a base frame 10 of plastic or other suitable material, side walls 12, end walls 14, and a top plate 16, all of which may be stamped from suitable sheet metal. In the embodiment shown, the end walls 14 and top plate 16 are stamped from a single sheet of metal bent into U shape, and the top plate is further provided with rectangular openings 18 to permit the insertion of the bread into the toaster ovens in the usual manner.

Also carried by the base frame 10 and located within the outer casing is a metal base plate 20 from which there vertically extends a rear plate 22, intermediate plate 24, and front plate 26. The rear and intermediate plates 22 and 24 are spaced apart approximately the width of a slice of bread and are connected at their upper and lower ends by four transversely spaced cross members 28, which members also support four transversely spaced heating elements 30.

The transverse cross members 28 also support a plurality of vertically arranged, longitudinally spaced wire elements 32 positioned in approximate alignment with the side edges of the top plate openings 18 and serving to guide the slices of bread when inserted into the toaster and for maintaining same out of direct contact with the heating elements 30. With this construction it will be seen that the rear and intermediate plates and heating elements define a pair of toasting ovens 31 into which the bread may be inserted through the top plate openings 18.

To raise and lower the bread, there is provided in each oven a carrier 34 having one free end in the oven and its other end extending through a vertical slot in the intermediate plate 24 to connect on the opposite side of the plate with a transverse cross member 38. The cross member 38 is connected to a vertical carrier slide 40 which comprises a U-shaped member having a long vertical leg 41 and laterally extending top and bottom arms 42 and 44. The arms 42 and 44 have aligned openings for positioning the slide on a circular guidepost 46 upon which it may be vertically raised or lowered. The guidepost 46 is rigidly positioned by securing its upper end in a flange 48 turned rearwardly from the front plate 26 and its lower end in an ear 50 also turned rearwardly from the forward plate 26.

The carrier slide 40 is freely slidable on the guidepost 46 and normally tends to gravitate downwardly thereon. To manipulate the slide there is provided a handle member 52 which is secured to the upper end of the leg 41 and extends forwardly and through a vertical slot 43 in the front plate 26 and outwardly of the casing through an aligned vertical slot 45 in the casing front end wall 14. The exterior forward end of the handle member may be provided with any suitable handle such, for example, as a plastic knob 54.

The carrier slide 40 rests on and is normally maintained in its uppermost or bread receiving position by an elevator or ejector 56. The elevator 56 (see Fig. 4) also comprises a U-shaped member having a long vertical leg 58 provided with laterally extending top and bottom arms 60 and 62 having aligned openings for positioning the elevator for slidable movement on the guidepost 46. The vertical legs of the elevator 56 and the carrier slide 40 are of substantially the same length (see Fig. 4), and they are so arranged on the guidepost that the lateral arms of the ejector or elevator 56 respectively underlie the lateral legs of the carrier slide 40; the reasons for this being hereinafter apparent.

The elevator 56 is normally maintained in its raised position and returned to raised position from lowered position by a spring motor, generally designated as 63; this motor being so constructed as to greatly reduce the upward speed of travel of the ejector upon being released at the completion of toasting operation, thus reducing the amount of shock resulting from such upward travel. More specifically, the spring motor 63 includes a relatively light coiled spring 64 having its lower end secured to an ear 66 extending laterally from the lower end of the elevator 56 and its upper end secured to the inner end of a lever 68. The lever 68 is pivotally supported on a stud 70 extending forwardly from the front plate 26 and is so mounted as to provide a long inner arm portion 69 and a short outer arm portion 71.

The spring motor further includes a spring 72 of greater strength than spring 64, and this latter spring has its upper end connected to the outer end of lever 68 and its lower end to a lever 74. The lever 74 has its upper end pivotally mounted on the stud 70, and its lower end extends through the base plate of the casing and is normally secured in any one of a plurality of positions by a bolt 80 extending through a slot in the lower end of the lever and an aligned opening in an ear projecting downwardly from the bottom edge of the front plate 26. The upper end of the lever 74 is also bent rearwardly to provide a transverse abutment 81 which functions as a limiting stop for the lever 68. As the lever 74 is normally fixed, the lower end of spring 72 will also be normally fixed; it being apparent, however, that by adjusting lever 74 about its pivot the tension of the spring 72 may be varied, thus changing the tension of the spring motor.

With the spring motor 63 constructed in the manner described, the parts normally assume the position shown in Fig. 4 with substantially no tension on the springs 64 and 72 due to the relative light weight of the elevator. Upon the initiation of a toasting operation by lowering the elevator, the spring 64 will initially expand until the tension thereon, plus the leverage of the long portion of arm 68, overcomes the tension of the spring 72. Thereafter the arm 68 will pivot and the elevator and spring 64 will in effect be lowered as a unit to the position shown in Fig. 5 with substantially no additional tension being placed on the spring 64.

In this way, the spring 64 is tensioned only through a partial downward movement of the elevator, and thus the total tension placed thereon is substantially less than that which would result were the spring tensioned throughout the total distance of travel of the elevator. As a result, upon the release of the elevator from its toasting position, the spring 72 will initially pivot the lever 68 in a counterclockwise direction and the spring 64 and elevator will simultaneously raise as a unit. Thereafter when the lever 68 has stopped against the abutment 81, spring 64 will act to raise the elevator through the remaining distance of travel. In this manner, because of the counterbalancing and the cooperative relationship of the two springs, the elevator is raised from toasting to ejecting position with relatively slow motion and will come to rest with substantially no shock and without affecting the adjustments of the automatic mechanism or placing undue wear on the parts.

In order to maintain the elevator 56 in its lowermost position against the tension of the spring motor 63, the elevator 56 is further provided with a pin 82 extending forwardly through the vertical slot 43 of the front plate 26. To cooperate with the pin and hold it in lowermost position, there is provided a latch 88 pivotally mounted on a pin 90 in vertical alignment with the slot 43. The latch is normally urged to rotate in a clockwise direction (as viewed in Fig. 3) by a spring 92 secured at one end to an arm 89 extending downwardly from the latch pivot point and its other end to an ear projecting from the front wall 26. The rotation of the latch 88 is limited by a stop 94, and, when so limited, a hook 96 provided on the upper end thereof lies across the slot 43 (see dotted position in Fig. 3) and in the path of movement of the elevator pin 82. With this arrangement, upon the lowering of the elevator the pin will engage the camming end 98 of the latch to pivot it counterclockwise until the pin is lowered beneath the hook 96, whereupon the spring 92 will then bias the latch into latching position over the pin and retain the elevator in its lowermost or toasting position.

To automatically release the latch 88 at the completion of a toasting period, there is associated therewith an automatic switch 100, a clock mechanism or timing means 101, and adjusting means 103 for setting the timing means to produce light or dark toast; all of the foregoing means being of conventional design. Associated with the switch 100 is a setting lever 104 and, with the timing means 101, a winding lever 102; these levers being interconnected by a link 105 whereby upon depressing the lever 104 the switch will be closed and the timing means set. The movement of lever 104 also controls latch 88, and for this purpose the outer end of the lever 104 carries a cam follower 106 adapted to engage a cam plate 108 extending forward from the latch 88. As the lever 104 moves upwardly, the follower 106 will engage the cam plate 108 to pivot the latch 88 in a counterclockwise direction and thus release the elevator at the completion of a toasting period and hold it released until lever 104 is reset.

To reset lever 104 there is further provided starting means, generally designated as 112;

which, upon being lowered, simultaneously lowers the carrier slide 40, the elevator 66, and engages the lever 104 to set the switch 100 and wind the clock mechanism 101. More particularly, the starting means also includes a U-shaped member 114 having top and bottom laterally turned arms 116 and 118 provided with aligned openings for slidably mounting the member on the guidepost 46. This member is so arranged that the lateral bottom arm 118 overlies the laterally extending arms of the carrier slide and the elevator whereby, upon lowering of the member 114, the carrier and elevator will be simultaneously lowered therewith. The upper lateral arm 116 of the member 114 is positioned above the lateral arms of the carrier slide and elevator, and the length of the vertical arm 114 is such that after the parts are lowered to toasting position the starting means will be automatically returned to raised position (see Figs. 5 and 7), whereas the elevator will be latched in lower position and the carrier gravity held in lower position.

To set the lever 104 upon the lowering of the starting means, there is secured to the U-shaped member 114 a handle member 120 which extends forwardly through the slot 43 in the front plate, and just forwardly of the front plate casing a depending setting arm 126. The arm 126 is of such length that its lower end will, upon the lowering of the starting means, engage the cam follower 106 of the setting lever to pivot same and simultaneously set the switch 100 and wind the clock mechanism 101.

The starting means 112 is normally maintained in its uppermost position by a spring 128 having its lowermost end secured to an ear 130 extending laterally from the member 114 and its upper end to the inturned bracket 48 of the front plate 26. Obviously upon the lowering of the starting means the spring 128 will be tensioned, and, upon release of the starting means, the spring 128 will return same to its upper position. In order to absorb the shock upon this return movement, there may further be provided on the guidepost 46 a coiled spring 117 positioned intermediate of the lateral arm 116 and the bracket 48.

Figure 2:
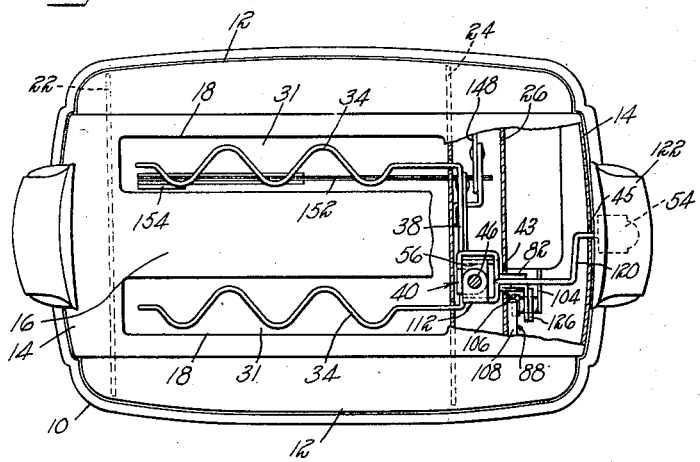
Fig. 2 is a plan view of Fig. 1.

To conveniently manipulate the starting means, the handle member 120 also extends through the slot 45 in the end wall 14 and on its outer end carries a handle 122 of plastic or other suitable material. As best seen in Figs. 1 and 2, the handle 122 is substantially wider than the handle 54 of the bread carrier, and normally the latter handle immediately underlies the former handle. However, when the parts have been lowered to initiate a toasting operation, the handle 122 will again be raised, whereas the handle 54 will remain in lowered position (see Fig. 7) permitting convenient manipulation of the carrier.

Briefly reviewing the operation of the toaster to this point, the parts normally assume the position shown in Figs. 1, 3, and 4. Following the insertion of a piece of bread into the toasting ovens, the handle 122 may be depressed, whereupon the lower lateral arm 118 of the starting means U-shaped member 114 will simultaneously force the carrier slide and elevator downwardly. In like manner, the setting lever 126 will be simultaneously lowered to engage the switch lever 104 to set the switch and wind the timing mechanism. The elevator pin 82 will also bias the latch 88 to cam the latching hook 96 out of its path of movement until it clears same, whereupon the latch will be automatically returned to latching position to retain the elevator in its lowermost position.

Upon the release of the handle 122, the spring 128 will return the starting means to its uppermost position, as indicated in Fig. 5, whereas the carrier slide, elevator, and spring motor will be in the positions shown in Figs. 5 and 7. The elevator will remain in this position until the clock mechanism has unwound sufficiently to raise the lever 104, opening the switch and pivoting the latch out of latching position. The carrier will likewise remain in the position shown in Fig. 5 unless it is desired to inspect the toast, which can be done by grasping the handle 54, which now will be positioned adjacent the bottom of the casing, to raise the slide independently of all of the other elements. This can be accomplished because the vertical lengths of the U members of the carrier slide and elevator are such as to permit a full raising of the carrier before the lower lateral leg of the carrier slide engages against the top lateral arm of the elevator. It is also apparent that when the carrier is raised, the timing mechanism will not be disturbed.

Finally, when the clock mechanism has run for a predetermined period, the latch 88 will be pivoted out of the path of the elevator pin 82, whereupon the spring motor will then raise the elevator and simultaneously raise the carrier.

In addition to the foregoing, the present toaster also embodies braking means for preventing starting of the timing means until the toaster ovens have reached a predetermined temperature. To accomplish this, there is pivotally mounted on the rear face of the front plate 26 a control lever 132. Extending forwardly from the lever 132 and through a slot in the front plate is a second lever 136 which, after passing through the slot, is bent forwardly and parallel to lever 132 and then terminates in a brake 138 adapted to normally rest on the clock mechanism escapement wheel 140. Also carried on the rear end of the lever 132 is a depending rod 142 having mounted thereon a vertically adjustable weight 144 which normally tends to pivot lever 132 downwardly and maintain brake 138 in braking engagement with the escapement wheel.

To release the braking means, the lower end of the rod 142 passes through an opening 146 in one arm of a bell crank lever 148, and the other arm of the bell crank lever is slotted at 150 to receive the free end of a bimetallic element 152. The opposite end of the bimetallic element is fixed at 154 to a supporting arm 156 secured to the base plate 20. The bimetallic element is connected directly into the heating circuit by a winding 158 (see Figs. 1 and 8) and, when cold, it holds the arm 147 of the lever 148 out of contact with the weight 144 on the rod 142. Upon heating of the thermostat 152, it will turn the lever 148 in a clockwise direction until the arm 147 engages the weight 144, raising the brake and permitting the starting of the clock. In this way, by adjusting the weight 144 on the rod 142, the temperature at which the clock is to be released may be controlled.

To further make the thermostatic element subject to direct heat of the circuit and not the radiant heat of the ovens, it will be seen by reference to Fig. 1 that it is located intermediate of the heating elements and the bottom plate 20. Immediately beneath the element the base plate 20 is provided with a large number of perforations 145, whereby as the toaster heats, a draft or flue effect is created, causing cold air to enter the bottom of the toaster, pass through the ovens, and escape from the top. However, when a piece of bread is in the toaster, the passage is substantially blocked, but, when removed, a blast of cold air through the oven will result; this cold air rapidly cooling the thermostat as well as rapidly cooling the oven. As the current has also been cut off, overheating of the ovens will not result as the air will not be trapped, and, should the ovens cool off below the desired temperature, the thermostat will again operate the braking means. With this arrangement, the ovens will always operate within a small range of temperature, resulting in consistent toasting of the bread.

For convenience in manufacture, the openings 145 may be made in a plate 150 which is hinged to the bottom plate 20 to provide a cleaning and inspection door.

Although a fully automatic toaster has been shown, it is obvious that many features, such, for example, as the elevator latching and raising means, could be incorporated in toasters lacking the automatic features.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In an electric toaster, a casing having a toaster oven, a carrier within the oven, an ejector on which the carrier is freely supported, said carrier and ejector being movable from raised to lowered position, spring means normally maintaining said ejector in raised position, restraining means for holding said ejector in lowered position when moved thereto, settable means for automatically releasing said restraining means at the completion of a toasting operation, starting means movable from raised to lowered position, said carrier lying in the path of movement of said starting means and engageable thereby when the starting means is moved to lowered position to force said carrier and ejector to lowered position whereby said restraining means will engage said ejector, means connected with said starting means for setting said settable means when said starting means is moved to lower position, and spring means for returning said starting means to raised position and out of engagement with said carrier, said carrier then being movable to raised position independent of the restrained ejector but normally remaining at rest thereon.

2. In a toaster, an ejector, manual means for lowering the ejector, means for latching the ejector in lowered position, means for releasing the latching means, and means for automatically raising the ejector upon being released and comprising a resilient member tensioned by the lowering of the ejector and having a lower end secured to the ejector and an upper end secured to a member mounted to move in a direction to lower the upper end of the resilient member, and means for restraining movement of said movable member until a predetermined tension has been placed on said resilient member.

3. In a toaster, an ejector, manual means for lowering the ejector, means for latching the ejector in lowered position, means for releasing the latching means, and means for automatically raising the ejector upon being released and comprising a spring motor including a pivoted lever, a spring secured to each end of said lever, one of said springs being secured at its opposite end to said ejector and the other spring having its other end fixed, the tension of said springs being so proportioned that upon predetermined downward movement of the ejector said lever will pivot in a direction to lower said ejector connected spring simultaneously with movement of the ejector.

4. In a toaster, an ejector, manual means for lowering said ejector, means for latching the ejector in lowered position, means for releasing the latching means, means for automatically raising the ejector upon being released and comprising a spring motor including a pivoted lever, a spring having its upper end secured to said lever and its lower end secured to the ejector, a second spring of greater strength than said first spring, having its upper end secured to said lever and its lower end fixed, said second spring normally resisting pivoting of the lever until a predetermined tension has been placed on said first spring upon lowering of the ejector, whereupon said lever will pivot in a direction to lower said first spring simultaneously with the ejector.

5. In a toaster, an ejector, manual means for lowering said ejector, means for latching the ejector in lowered position, means for releasing the latching means, means for automatically raising the ejector upon being released and comprising a pivoted lever, a first spring having one end connected to the lever and its other end secured to the ejector, a second spring having one end connected to the lever and the other end fixed, said second spring normally resisting pivoting of the lever until a predetermined tension has been placed on said first spring upon the lowering of the ejector, whereupon said first lever will pivot to lower said first spring simultaneously with the ejector.

6. In a toaster having ejecting means movable from raised to lowered position, means for raising said ejecting means from lowered to raised position comprising a resilient member tensioned by the lowering of the ejector and having an upper end secured to a member mounted to move in a direction to lower the upper end of the resilient member, and means for restraining movement of said movable member until a predetermined tension has been placed on said resilient member.

7. In an electric toaster, a casing having a toaster oven, an ejector mounted for vertical movement between a raised and a lowered position, a carrier extending into said oven and freely supported for movement therewith, said carrier having a handle externally of the casing for raising and lowering the carrier with respect to the ejector when the latter is held in lowered position, spring means normally urging said ejector into raised position, releasable restraining means for holding said ejector in lowered position when moved thereto, settable means for automatically releasing said restraining means at the completion of a toasting operation, manually operable starting means movable between a raised position and a lowered position and operable upon being lowered to move said carrier and ejector to lowered position and to set said settable means, and spring means for returning said starting means to raised position after it has been moved to lowered position.

8. In an electric toaster, a casing having a toaster oven, an ejector mounted at one end of the oven for vertical movement between raised and lowered position, a toast carrier extending into said oven and freely supported on said ejector and mounted for vertical movement between raised and lowered positions, said carrier having a handle externally of the casing for raising and lowering the carrier with respect to the ejector when the latter is held in lowered position, spring means normally urging said ejector into raised position, releasable latching means for restraining said ejector in lowered position, settable means for automatically releasing said latching means at the completion of a toasting period, starting means mounted for vertical movement between raised and lowered positions and having a handle located above said first mentioned handle, means on said starting means for engaging said carrier to lower the same and the ejector to lowered position when said starting means is lowered, means connected to said starting means for setting said settable means when the said starting means is lowered to lowered position and spring means for returning said starting means to raised position after the same has been lowered.

OSCAR M. ANDERSON.